United States Patent
Takayama

(10) Patent No.: US 6,459,520 B1
(45) Date of Patent: Oct. 1, 2002

(54) OPTICAL SCANNING APPARATUS AND IMAGE FORMING APPARATUS USING IT

(75) Inventor: Hidemi Takayama, Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/349,111

(22) Filed: Jul. 8, 1999

(30) Foreign Application Priority Data

Jul. 13, 1998 (JP) .......................................... 10-213470
Jun. 14, 1999 (JP) .......................................... 11-167418

(51) Int. Cl.[7] .............................................. G02B 26/08
(52) U.S. Cl. ...................... 359/204; 359/212; 359/216; 347/243; 250/234
(58) Field of Search ................................ 359/204–208, 359/212–219; 250/234–236; 347/225, 232–235, 241–244

(56) References Cited

U.S. PATENT DOCUMENTS 5,208,456 A * 5/1993 Appel et al. ................. 359/204
5,874,929 A * 2/1999 Opower et al. ............. 359/204

FOREIGN PATENT DOCUMENTS

JP          1-281468          11/1989

* cited by examiner

Primary Examiner—James Phan
(74) Attorney, Agent, or Firm—Fitzpatrick, Cella, Harper & Scinto

(57) ABSTRACT

An optical scanning apparatus includes a light source having a plurality of light-emitting portions arranged as inclined with respect to a main scanning direction, a deflector for deflecting a plurality of light beams emitted from the light source, an imaging system for guiding the plurality of light beams deflected and reflected by the deflector, onto a scanned surface, a detector arranged substantially at the same position as the scanned surface and in a normal direction to the main scanning direction. The detector detects scanning positions of the plurality of light beams and a difference between pass times of the plurality of light beams to thereby detect deviation of the scanning positions and variation of magnification of the optical scanning apparatus. A correcting device is provided for correcting drawing positions of the plurality of light beams on the scanned surface, based on the result of detection by the detector.

29 Claims, 10 Drawing Sheets

OPTICAL SCANNING APPARATUS AND IMAGE FORMING APPARATUS USING IT

BACKGROUND OF THE INVENTION

1. Field of the Invention

The present invention relates to an optical scanning apparatus and an image forming apparatus using it, and, more particularly, to the apparatus constructed in such structure that in formation of an image with a plurality of light beams, a detecting means comprised of a single sensor detects environmental variation of the optical scanning apparatus, particularly, deviation of scanning positions and variation of magnification occurring with temperature changes, and that drawing positions of the light beams on a scanned surface are corrected based thereon, thereby obtaining a good image.

2. Related Background Art

FIG. 1 is a schematic diagram of a major part of a conventional optical scanning apparatus using a multi-laser light source.

In the same figure a plurality of (two in the same figure) light beams (nearly parallel beams) emitted from laser unit 131 are incident into a cylindrical lens 132 having a predetermined refracting power in the sub-scanning direction. The nearly parallel beams incident into the cylindrical lens 132 emerge as nearly parallel beams in the principal scanning section. In the sub-scanning section they converge to be focused as almost line images on a deflecting face (reflecting surface) 133a of optical defector 133. The plurality of light beams deflected and reflected by the deflecting face 133a are condensed through imaging means (fθ lens system) 140 having spherical lens 134 and toric lens 135, onto the surface of a photosensitive drum 136. With rotating the optical deflector 133 in the direction of arrow A, the plurality of light beams scan the area on the surface of the photosensitive drum 136 at constant speed in the direction of arrow 8 (in the main scanning direction). This effects recording of an image on the surface of photosensitive drum 136 being a recording medium. Although the laser unit 131 emits the two light beams, only one of them is illustrated in FIG. 1.

A color image forming apparatus such as a full color printer or the like for multi-color development by use of a plurality of such optical scanning devices described above is suggested, for example, in Japanese Laid-open Patent Application No. 1-281468. The application describes the apparatus for forming a color image by multiply transferring images obtained by the respective optical scanning devices onto a recording medium. In the apparatus of the application, in order to prevent chromatic deviation occurring upon superposition of the images on the recording medium, a detecting means detects positions of detected images drawn on a transfer medium conveyed on a transfer belt in each of the optical scanning devices and the chromatic deviation is prevented by controlling image forming portions according to output signals from the detecting means.

The apparatus of the above application, however, had such tendencies that the structure of the detecting means became complicated and could not easily effect the detection in real time. Further, the application disclosed nothing about a method for detecting the environmental variation of each optical scanning device, particularly, about a method for detecting deviation of the scanning positions, variation of magnification of the optical system, etc. occurring with temperature change.

SUMMARY OF THE INVENTION

An object of the present invention is to provide an optical scanning apparatus having a multi-laser light source, capable of obtaining a good image by such structure that simple detecting means, including a single sensor, detects the deviation of the scanning positions and the variation of magnification, and that correcting means corrects image deviation based on the result of the detection, and also provides an image forming apparatus using it.

Another object of the present invention is to provide an optical scanning apparatus having a multi-laser light source, capable of obtaining a good image by such structure that simple detecting means, including a single sensor, detects the deviation of the scanning positions and the variation of magnification occurring with temperature changes of the apparatus and that correcting means corrects image deviation based on the result of the detection, and also provides an image forming apparatus using it.

An optical scanning apparatus of the present invention is an optical scanning apparatus arranged to guide a plurality of light beams, emitted from light source means having a plurality of light-emitting portions arranged as inclined with respect to a main scanning direction, to a deflecting means, guide the plurality of light beams deflected and reflected by the deflecting means onto a scanned surface by imaging means, and optically scan an area on the scanned surface simultaneously with the plurality of light beams.

The detecting means are arranged on a surface substantially at the same position as the scanned surface and in a normal direction to the main scanning. The plurality of light beams from the light source means via the deflecting means are focused by the imaging means, wherein the detecting means detects scanning positions of the plurality of light beams and differences between pass times of the plurality of light beams, thereby detecting deviation of the scanning positions and variation of magnification occurring with temperature changes of the optical scanning apparatus. Correcting means correct drawing positions of the plurality of light beams on the scanned surface, based on the result of the detection.

Another optical scanning apparatus of the present invention is an optical scanning apparatus arranged to guide a plurality of light beams, emitted from light source means having a plurality of light-emitting portions arranged in a normal direction to a main scanning direction, to a deflecting means, guide the plurality of light beams deflected and reflected by the deflecting means onto a scanned surface by imaging means, and optically scan an area on the scanned surface simultaneously with the plurality of light beams.

The detecting means are arranged on a surface substantially at the same position as the scanned surface and as inclined with respect to the main scanning direction. The plurality of light beams from the light source means via the deflecting means are focused by the imaging means, wherein the detecting means detects scanning positions of the plurality of light beams and differences between pass times of the plurality of light beams, thereby detecting deviation of the scanning positions and variation of magnification occurring with temperature changes of the optical scanning apparatus, and wherein correcting means corrects drawing positions of the plurality of light beams on the scanned surface, based on the result of the detection.

Another optical scanning apparatus of the present invention is an optical scanning apparatus arranged to guide a plurality of light beams emitted from a light source means having a plurality of light-emitting portions, arranged as inclined with respect to a main scanning direction, to a deflecting means, guide the plurality of light beams deflected and reflected by the deflecting means onto a scanned surface by imaging means, and optically scan an area on the scanned surface simultaneously with the plurality of light beams.

A slit is disposed in front of a detecting means arranged substantially at the same position as the scanned surface and in a normal direction to the main scanning direction. The plurality of light beams from the light source means via the deflecting means are focused on a surface of the detecting means through the slit by the imaging means, and the detecting means detects scanning positions of the plurality of light beams and intensity variation of output signals, thereby detecting deviation of the scanning positions and variation of magnification occurring with temperature changes of the optical scanning apparatus. Correcting means corrects drawing positions of the plurality of light beams on the scanned surface, based on the result of the detection.

The above optical scanning apparatus of the present invention is also characterized in that when at least one of an amount of the deviation of the scanning positions or an amount of the variation of magnification detected by the detecting means reaches a predetermined level, the correcting means corrects the drawing positions of the plurality of light beams on the scanned surface.

The above optical scanning apparatus of the present invention is also characterized in that based on the result of the detection at a predetermined time after power-on of the optical scanning apparatus, the correcting means corrects the drawing positions of the plurality of light beams on the scanned surface.

An image forming apparatus of the present invention uses a plurality of optical scanning devices described above and forms a color image by multiply transferring images obtained by the plurality of optical scanning devices each onto a recording medium.

Another optical scanning apparatus of the present invention is an optical scanning apparatus arranged to guide a plurality of light beams, emitted from light source means having a plurality of light-emitting portions arranged as inclined with respect to a main scanning direction, to a deflecting means, guide the plurality of light beams deflected and reflected by the deflecting means onto a scanned surface by imaging means, and optically scan an area on the scanned surface simultaneously with the plurality of light beams.

The optical scanning apparatus includes detecting means arranged substantially at the same position as the scanned surface and in a normal direction to the main scanning direction. The detecting means detects scanning positions of the plurality of light beams and differences between pass times of the plurality of light beams, thereby detecting deviation of the scanning positions and variation of magnification, while the plurality of light beams from the light source means via the deflecting means are focused thereon by the imaging means. The optical scanning apparatus also includes correcting means for correcting drawing positions of the plurality of light beams on the scanned surface, and temperature detecting means provided in the optical scanning apparatus.

The temperature detecting means detects a temperature in the optical scanning apparatus after power-on of the optical scanning apparatus. The correcting means corrects the drawing positions of the plurality of light beams, based on the detection result of the detecting means, in accordance with changes in the temperature detected, or every time the temperature detected reaches a preset temperature.

Another optical scanning apparatus of the present invention is an optical scanning apparatus arranged to guide a plurality of light beams, emitted from light source means having a plurality of light-emitting portions arranged as inclined with respect to a main scanning direction, to a deflecting means, guide the plurality of light beams deflected and reflected by the deflecting means onto a scanned surface by imaging means, and optically scan an area on the scanned surface simultaneously with the plurality of light beams.

The optical scanning apparatus includes detecting means arranged substantially at the same position as the scanned surface and in a normal direction to the main scanning direction. The detecting means detects scanning positions of the plurality of light beams and differences between pass times of the plurality of light beams, thereby detecting deviation of the scanning positions and variation of magnification, while the plurality of light beams from the light source means via the deflecting means are focused thereon by the imaging means. The optical scanning apparatus also includes correcting means for correcting drawing positions of the plurality of light beams on the scanned surface, and time measuring means for measuring a time after power-on of the optical scanning apparatus.

The correcting means corrects the drawing positions of the plurality of light beams, based on the detection result of the detecting means, in accordance with the time measured, or at a preset time.

Another optical scanning apparatus of the present invention is an optical scanning apparatus arranged to guide a plurality of light beams, emitted from light source means having a plurality of light-emitting portions arranged as inclined with respect to a main scanning direction, to a deflecting means, guide the plurality of light beams deflected and reflected by the deflecting means onto a scanned surface by imaging means, and optically scan an area on the scanned surface simultaneously with the plurality of light beams.

The optical scanning apparatus includes detecting means arranged substantially at the same position as the scanned surface and as inclined with respect to the main scanning direction. The detecting means detects scanning positions of the plurality of light beams and differences between pass times of the plurality of light beams, thereby detecting deviation of the scanning positions and variation of magnification, while the plurality of light beams from the light source means via the deflecting means are focused thereon by the imaging means. The optical scanning apparatus also includes correcting means for correcting drawing positions of the plurality of light beams on the scanned surface, and temperature detecting means provided in the optical scanning apparatus.

The temperature detecting means detects a temperature in the optical scanning apparatus after power-on of the optical scanning apparatus. The correcting means corrects the drawing positions of the plurality of light beams based on the detection result of the temperature detecting means in accordance with changes in the temperature detected, or every time the temperature detected reaches a preset temperature.

Another optical scanning apparatus of the present invention is an optical scanning apparatus arranged to guide a plurality of light beams, emitted from light source means having a plurality of light-emitting portions arranged as inclined with respect to a main scanning direction, to a deflecting means, guide the plurality of light beams deflected and reflected by the deflecting means onto a scanned surface by imaging means, and optically scan an area on the scanned surface simultaneously with the plurality of light beams.

The optical scanning apparatus includes detecting means arranged substantially at the same position as the scanned surface and as inclined with respect to the main scanning direction. The detecting means detects scanning positions of the plurality of light beams and differences between pass times of the plurality of light beams, thereby detecting deviation of the scanning positions and variation of magnification, while the plurality of light beams from the light source means via the deflecting means are focused thereon by the imaging means. The optical scanning apparatus also includes correcting means for correcting drawing positions of the plurality of light beams on the scanned surface, and time measuring means for measuring a time after power-on of the optical scanning apparatus.

The correcting means corrects the drawing positions of the plurality of light beams based on the detection result of the detecting means, in accordance with the time measured, or at a preset time.

Another optical scanning apparatus of the present invention is an optical scanning apparatus arranged to guide a plurality of light beams, emitted from light source means having a plurality of light-emitting portions arranged as inclined with respect to a main scanning direction, to a deflecting means, guide the plurality of light beams deflected and reflected by the deflecting means onto a scanned surface by imaging means, and optically scan an area on the scanned surface simultaneously with the plurality of light beams.

The optical scanning apparatus includes detecting means arranged substantially at the same position as the scanned surface and in a normal direction to the main scanning direction. The detecting means detects scanning positions of the plurality of light beams and intensity variation of output signals, thereby detecting deviation of the scanning positions and variation of magnification, while the plurality of light beams from the light source means via the deflecting means are focused thereon by the imaging means through a slit disposed in front of the detecting means. The optical scanning apparatus also includes correcting means for correcting drawing positions of the plurality of light beams on the scanned surface, and temperature detecting means provided in the optical scanning apparatus.

The temperature detecting means detects a temperature in the optical scanning apparatus after power-on of the optical scanning apparatus. The correcting means corrects the drawing positions of the plurality of light beams based on the detection result of the temperature detecting means, in accordance with changes in the temperature detected, or every time the temperature detected reaches a preset temperature.

Another optical scanning apparatus of the present invention is an optical scanning apparatus arranged to guide a plurality of light beams, emitted from a light source means having a plurality of light-emitting portions arranged as inclined with respect to a main scanning direction, to a deflecting means, guide the plurality of light beams deflected and reflected by the deflecting means onto a scanned surface by imaging means, and optically scan an area on the scanned surface simultaneously with the plurality of light beams.

The optical scanning apparatus includes detecting means arranged substantially at the same position as the scanned surface and in a normal direction to the main scanning direction. The detecting means detects scanning positions of the plurality of light beams and intensity variation of output signals, thereby detecting deviation of the scanning positions and variation of magnification, while the plurality of light beams from the light source means via the deflecting means are focused thereon by the imaging means through a slit disposed in front of the detecting means. The optical scanning apparatus also includes correcting means for correcting drawing positions of the plurality of light beams on the scanned surface, and time measuring means for measuring a time after power-on of the optical scanning apparatus.

The correcting means corrects the drawing positions of the plurality of light beams, based on the detection result of the detecting means, in accordance with the time measured, or at a preset time.

Another image forming apparatus of the present invention is characterized by forming an image by transferring an image formed by use of the optical scanning apparatus described above onto a recording medium.

Another image forming apparatus of the present invention is characterized by using a plurality of optical scanning devices as described above and forming a color image by transferring each of the images obtained by the plurality of optical scanning devices onto a recording medium.

Another image forming apparatus of the present invention is an image forming apparatus arranged to guide a plurality of light beams, emitted from a light source means having a plurality of light-emitting portions arranged as inclined with respect to a main scanning direction, to a deflecting means, guide the plurality of light beams deflected and reflected by the deflecting means onto an image carrier surface, and optically scan an area on the image carrier surface simultaneously with the plurality of light beams.

The image forming apparatus includes detecting means arranged substantially at the same position as the image carrier surface and in a normal direction to the main scanning direction. The detecting means detects scanning positions of the plurality of light beams and differences between pass times of the plurality of light beams, thereby detecting deviation of the scanning positions and variation of magnification, while the plurality of light beams from the light source means by the deflecting means are focused thereon by the imaging means. The image forming apparatus also includes correcting means for correcting drawing positions of the plurality of light beams on the image carrier surface, and number-of-printed-sheets calculating means for calculating a number of printed sheets after power-on of the image forming apparatus.

Based on a signal from the number-of-printed-sheets calculating means and the detection result of the detecting means, the correcting means corrects the drawing positions of the plurality of light beams.

Another image forming apparatus of the present invention is an image forming apparatus arranged to guide a plurality of light beams, emitted from a light source means having a plurality of light-emitting portions arranged as inclined with respect to a main scanning direction, to a deflecting means, guide the plurality of light beams deflected and reflected by the deflecting means onto an image carrier surface, and optically scan an area on the image carrier surface simultaneously with the plurality of light beams.

The image forming apparatus includes detecting means arranged substantially at the same position as the image carrier surface and inclined with respect to the main scanning direction. The detecting means detects scanning positions of the plurality of light beams and differences between pass times of the plurality of light beams, thereby detecting deviation of the scanning positions and variation of magnification, while the plurality of light beams from the light source means by the deflecting means are focused thereon by the imaging means. The image forming apparatus also includes correcting means for correcting drawing positions of the plurality of light beams on the image carrier surface, and number-of-printed-sheets calculating means for calculating a number of printed sheets after power-on of the image forming apparatus.

Based on a signal from the number-of-printed-sheets calculating means and the detection result of the detecting means, the correcting means corrects the drawing positions of the plurality of light beams.

Another image forming apparatus of the present invention is an image forming apparatus arranged to guide a plurality of light beams, emitted from light source means having a plurality of light-emitting portions arranged as inclined with respect to a main scanning direction, to a deflecting means, guide the plurality of light beams deflected and reflected by the deflecting means onto an image carrier surface, and optically scan an area on the image carrier surface simultaneously with the plurality of light beams.

The image forming apparatus includes detecting means arranged substantially at the same position as the image carrier surface and in a normal direction to the main scanning direction. The detecting means detects scanning positions of the plurality of light beams and intensity variation of output signals, thereby detecting deviation of the scanning positions and variation of magnification, while the plurality of light beams from the light source means via the deflecting means are focused thereon by the imaging means through a slit disposed in front of the detecting means. The image forming apparatus also includes correcting means for correcting drawing positions of the plurality of light beams on the image carrier surface, and number-of-printed-sheets calculating means for calculating a number of printed sheets after power-on of the image forming apparatus.

Based on a signal from the number-of-printed-sheets calculating means and the detection result of the detecting means, the correcting means corrects the drawing positions of the plurality of light beams.

A further optical scanning apparatus of the present invention is an optical scanning apparatus arranged to guide a plurality of light beams, emitted from a light source means having a plurality of light-emitting portions arranged as inclined with respect to a main scanning direction, to a deflecting means, guide the plurality of light beams deflected and reflected by the deflecting means onto a scanned surface by imaging means, and optically scan an area on the scanned surface simultaneously with the plurality of light beams.

The detecting means are arranged on a surface substantially at the same position as the scanned surface and in a normal direction to the main scanning direction. The plurality of light beams from the light source means by the deflecting means are focused by the imaging means. The detecting means detects scanning positions of the plurality of light beams and differences between pass times of the plurality of light beams, thereby detecting deviation of the scanning positions and variation of magnification of the optical scanning apparatus. The correcting means corrects drawing positions of the plurality of light beams on the scanned surface, based on the result of the detection.

Another optical scanning apparatus of the present invention is an optical scanning apparatus arranged to guide a plurality of light beams, emitted from a light source means having a plurality of light-emitting portions arranged in a normal direction to a main scanning direction, to a deflecting means, guide the plurality of light beams deflected and reflected by the deflecting means, onto a scanned surface by imaging means, and optically scan an area on the scanned surface simultaneously with the plurality of light beams.

The detecting means are arranged on a surface substantially at the same position as the scanned surface and inclined with respect to the main scanning direction. The plurality of light beams from the light source means via the deflecting means are focused by the imaging means. The detecting means detects scanning positions of the plurality of light beams and differences between pass times of the plurality of light beams, thereby detecting deviation of the scanning positions and variation of magnification of the optical scanning apparatus. The correcting means corrects drawing positions of the plurality of light beams on the scanned surface, based on the result of the detection.

Another optical scanning apparatus of the present invention is an optical scanning apparatus arranged to guide a plurality of light beams, emitted from a light source means having a plurality of light-emitting portions arranged as inclined with respect to a main scanning direction, to a deflecting means, guide the plurality of light beams deflected and reflected by the deflecting means onto a scanned surface by imaging means, and optically scan an area on the scanned surface simultaneously with the plurality of light beams.

A slit is disposed in front of the detecting means arranged substantially at the same position as the scanned surface and in a normal direction to the main scanning direction. The plurality of light beams from the light source means via the deflecting means are focused on a surface of the detecting means through the slit by the imaging means. The detecting means detects scanning positions of the plurality of light beams and intensity variation of output signals, thereby detecting deviation of the scanning positions and variation of magnification of the optical scanning apparatus. Correcting means corrects drawing positions of the plurality of light beams on the scanned surface based on the result of the detection.

The above optical scanning apparatus of the present invention is also characterized in that when at least one of an amount of the deviation of the scanning positions or an amount of the variation of magnification detected by the detecting means reaches a predetermined level, the correcting means corrects the drawing positions of the plurality of light beams on the scanned surface.

The above optical scanning apparatus of the present invention is also characterized in that based on the result of the detection at a predetermined time after power-on of the optical scanning apparatus, the correcting means corrects the drawing positions of the plurality of light beams on said scanned surface.

A further image forming apparatus of the present invention uses a plurality of optical scanning devices described above and forms a color image by multiply transferring images obtained by a plurality of optical scanning devices each onto a recording medium.

DETAILED DESCRIPTION OF THE PREFERRED EMBODIMENTS

Figure 1:
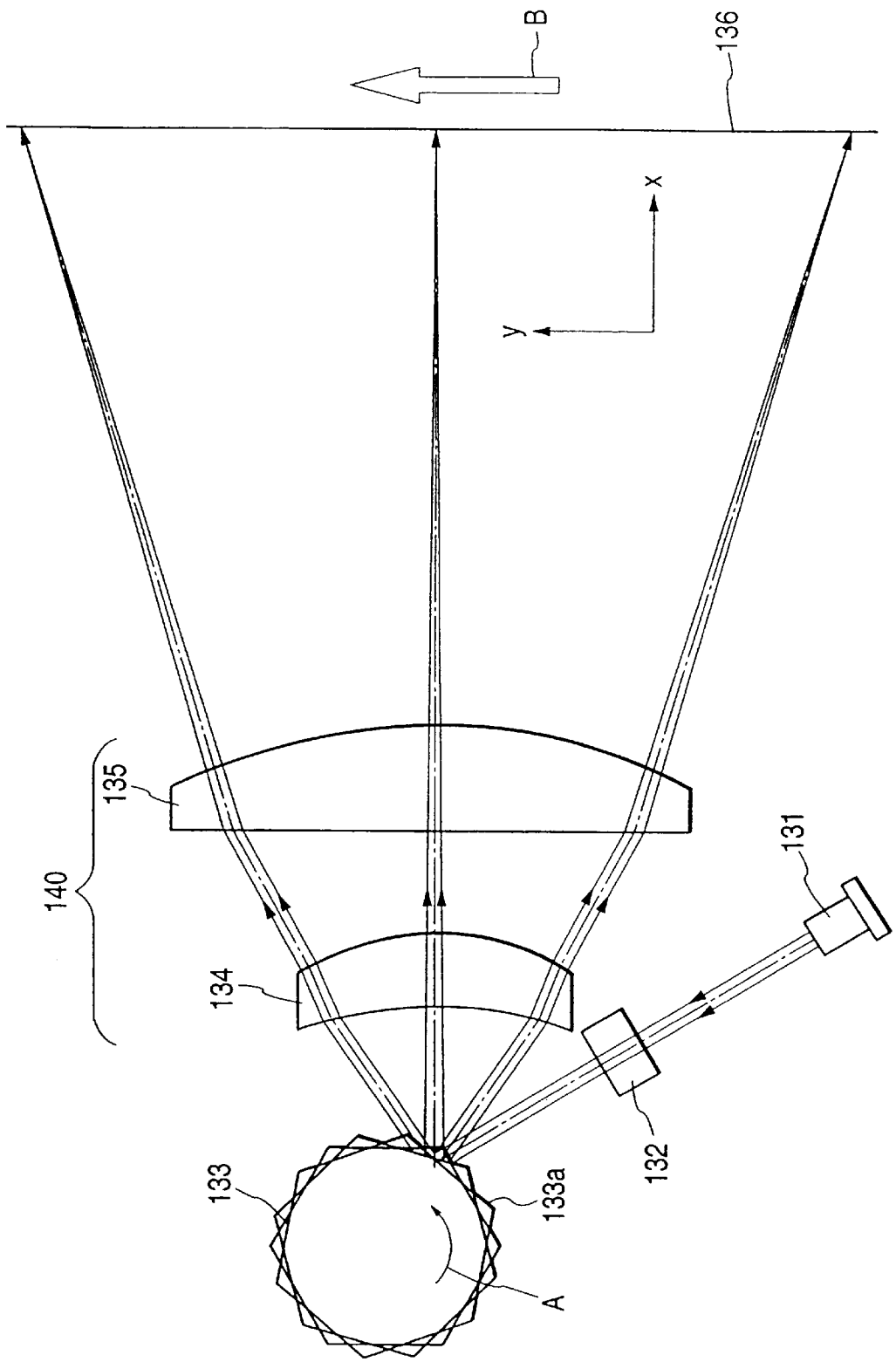
FIG. 1 is a sectional view of a major part of an optical system of the conventional optical scanning apparatus.
Figure 2:
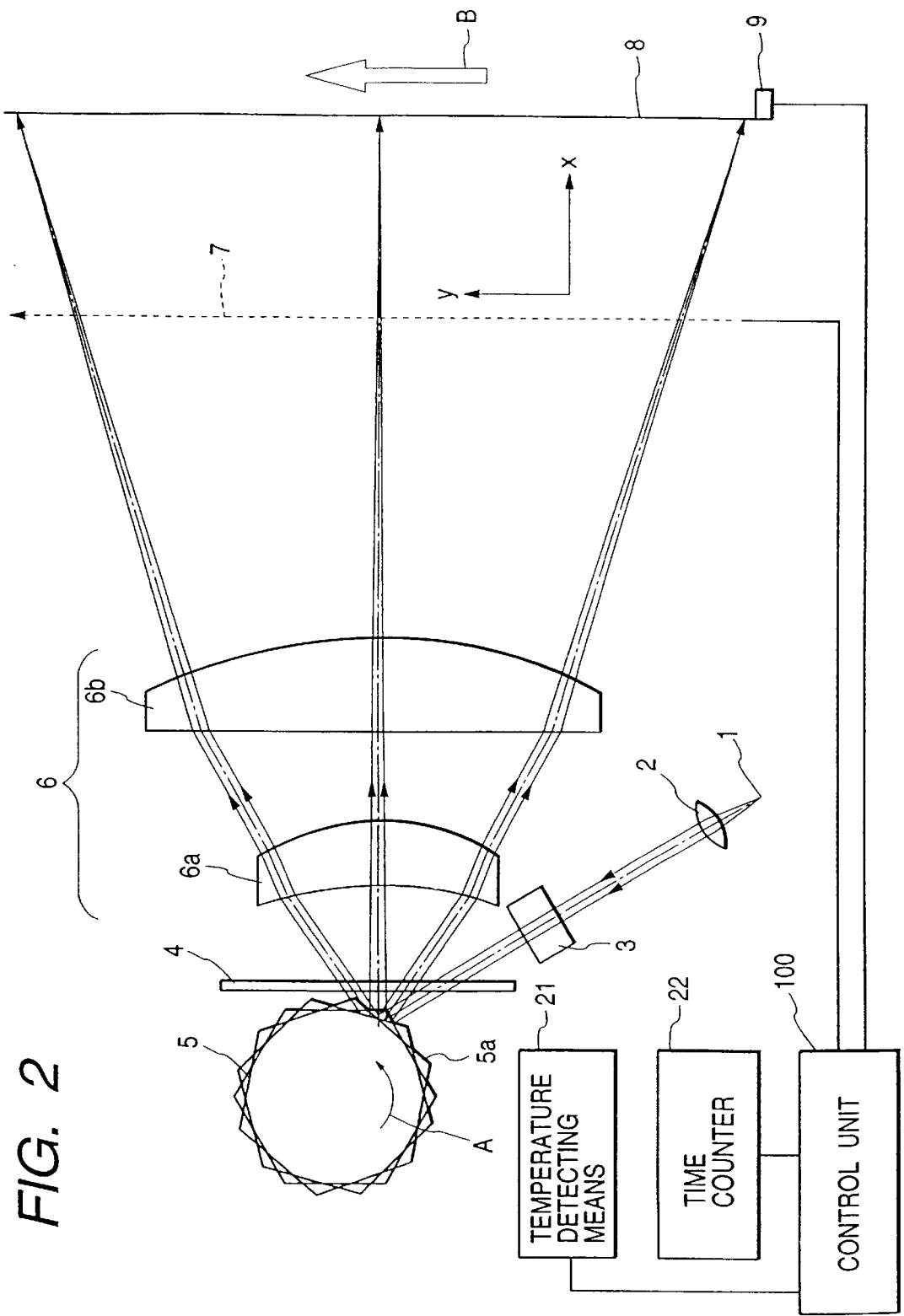
FIG. 2 is a view in a main scanning section of Embodiment 1 of the present invention.
Figure 3:
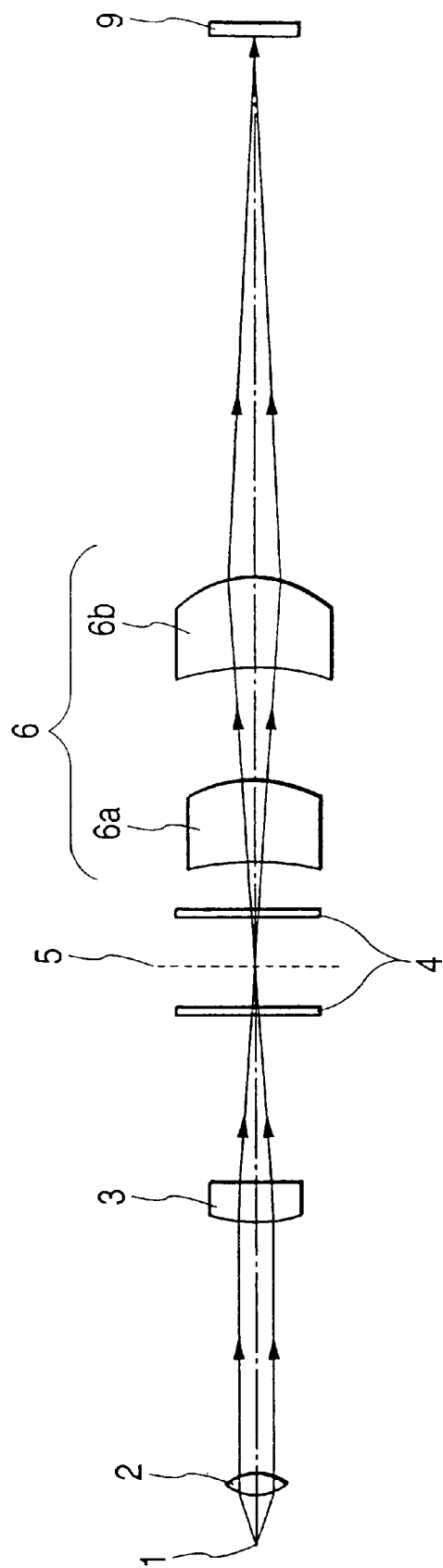
FIG. 3 is a view in a sub-scanning section of Embodiment 1 of the present invention.

FIG. 2 is a sectional view of a major part along the main scanning direction of Embodiment 1 of the present invention (which is a view in the main scanning section) and FIG. 3 is a sectional view of a major part in the sub-scanning direction of Embodiment 1 of the present invention (which is a view in the subscanning section).

In the figures reference numeral 1 designates a light source means having a plurality of light-emitting portions (two light-emitters in the present embodiment) inclined relative to the main scanning direction, which is comprised, for example, of a multi-laser light source, and which emits a plurality of light beams (bundles of rays) optically modulated according to image information independently of each other. Numeral 2 denotes a collimator lens which converts the plurality of light beams emitted from the multi-laser light source 1 into nearly parallel beams. Numeral 3 represents a cylindrical lens, which has a predetermined refracting power in the sub-scanning direction. Numeral 4 indicates a dust-proof glass aperture. Numeral 5 denotes a deflecting means, which is comprised, for example, of an optical deflector (polygon mirror), and which is rotated at constant speed in the direction of arrow A by a driving means (not illustrated) such as a motor or the like. Numeral 6 is an fθ lens system (imaging lens system) as an imaging means, which is composed of two lenses, spherical lens 6a and toric lens 6b, which focus the plural light beams based on the image information, deflected and reflected by the optical deflector 5, on a scanned surface 8 via an angled mirror (return mirror) 7 as a correcting means. The angled mirror 7 corrects drawing positions of the light beams on the scanned surface 8 by an image deviation correcting method detailed hereinafter. Numeral 8 designates the scanned surface, which is, for example, a surface of a photosensitive drum in copiers, laser beam printers (LBPs), and so on.

Numeral 9 denotes a detecting means, which is composed of a single linear photosensor and which is located near the peripheral part of the scanned surface 8 and approximately at the same position as it, and arranged in the normal direction (the sub-scanning direction) to the main scanning direction. In the present embodiment this linear photosensor 9 is used to detect scanning positions of the plural light beams in the sub-scanning direction and differences between pass times of the light beams, as will be described hereinafter, thereby detecting deviation of scanning positions (relative deviation in the sub-scanning direction between the plural light beams) and variation of magnification of the optical system (relative positional deviation in the main scanning direction and in the sub-scanning direction between the light beams) occurring with changes in temperature of this apparatus.

Numeral 21 represents a temperature detecting means, which detects the temperature in the apparatus after power-on of the optical scanning apparatus or which detects preset temperatures. Numeral 22 indicates a time measuring means or time counter, which measures the time after power-on of the optical scanning apparatus or which measures preset times. Numeral 100 is a control unit for controlling the angled mirror 7, based on detected signals from the temperature detecting means 21, the time measuring means 22, and the detecting means 9.

Although the multi-laser light source 1 emits the two light beams, only one of them is illustrated in FIG. 2 and FIG. 3.

Figure 4:
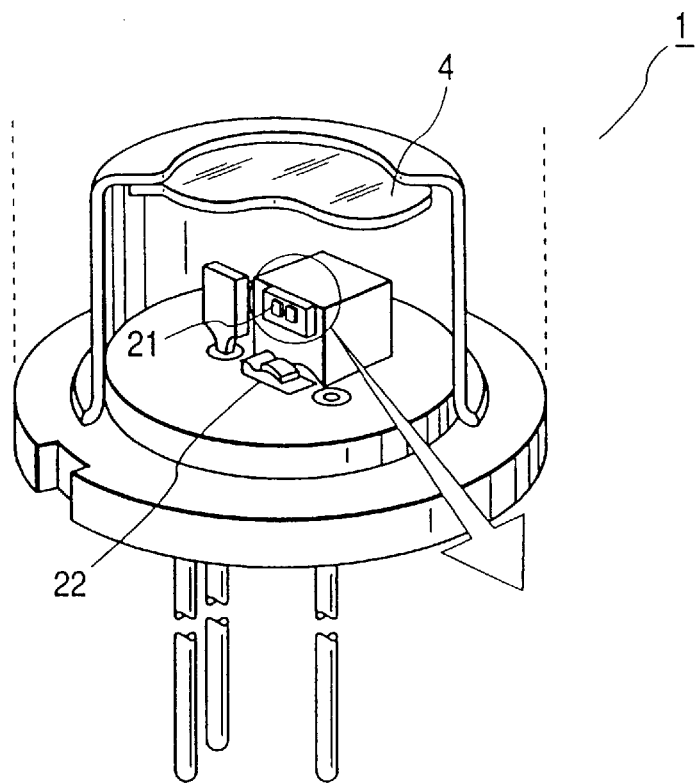
FIG. 4 is an enlarged explanatory diagram of a multi-laser light source illustrated in FIG. 2.
Figure 5:
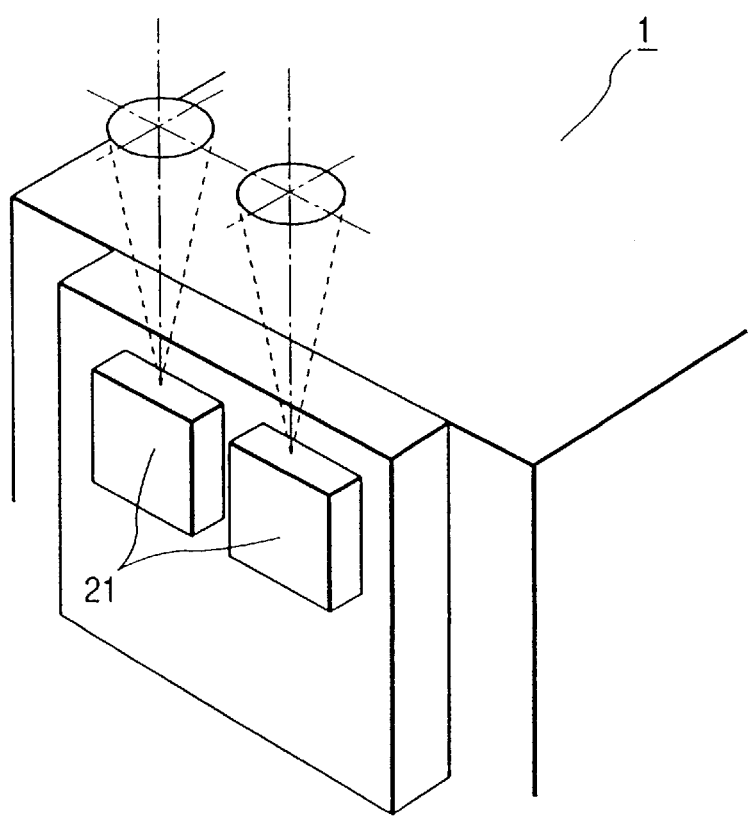
FIG. 5 is an enlarged explanatory diagram of the multi-laser light source illustrated in FIG. 2.

FIG. 4 and FIG. 5 are enlarged explanatory diagrams of the multi-laser light source illustrated in FIG. 2 and FIG. 3. In these figures, numeral 1 designates the multi-laser light source, and 21 21 are laser chips (the light-emitting portions), each of which emits a light beam optically modulated according to an image signal independently. Numeral 22 indicates a photodiode for a monitor and 4 the dust-proof glass aperture.

In FIG. 4 and FIG. 5 the plurality of laser chips 21 21 forming the multi-laser light source 1 are arranged at predetermined intervals in the main scanning direction, and in the sub-scanning direction and as inclined with respect to the main scanning direction, whereby they form beam spots at positions spaced at predetermined intervals in the main scanning direction and in the sub-scanning direction on the scanned surface (image surface).

In the present embodiment, the light beams emitted as optically modulated independently from the multi-laser light source 1 are collimated into nearly parallel beams by the collimator lens 2 to be incident into the cylindrical lens 3.

The nearly parallel beams incident into the cylindrical lens 3 emerge as nearly parallel beams in the main scanning section. In the sub-scanning section, the beams converge to be focused as almost line images or a deflecting face 5a of the optical deflector 5. Then the light beams deflected and reflected by the deflecting face 5a are condensed through the imaging lens system 6 onto the photosensitive drum surface 8. The optical deflector 5 is rotated in the direction of arrow A, whereby the plural light beams scan the area on the photosensitive drum surface 8 at uniform velocity in the direction of arrow B (in the main scanning direction). This effects image recording on the photosensitive drum surface 8 being a recording medium.

At this time the present embodiment is arranged so that before the optical scanning on the photosensitive drum surface 8, the plural light beams from the multi-laser light source 1, deflected and reflected by the deflecting face Sa of the optical deflector 5, are preliminarily focused on the surface of the linear photosensor 9 by the imaging lens system 6. Then the linear photosensor 9 detects the scanning positions of the plural light beams in the sub-scanning direction and differences between pass times of the light beams, thereby detecting the deviation of scanning positions and the variation of magnification of the optical system occurring with temperature changes in the present apparatus. Then the drawing positions of the light beams on the photosensitive drum surface 8 are corrected by the angled mirror 7 as the correcting means, based on the detection results.

The means for detecting the deviation of scanning positions and the variation of magnification of the optical system occurring with temperature changes in the present apparatus will be described referring to FIG. 6 and FIG. 7.

Figure 6:
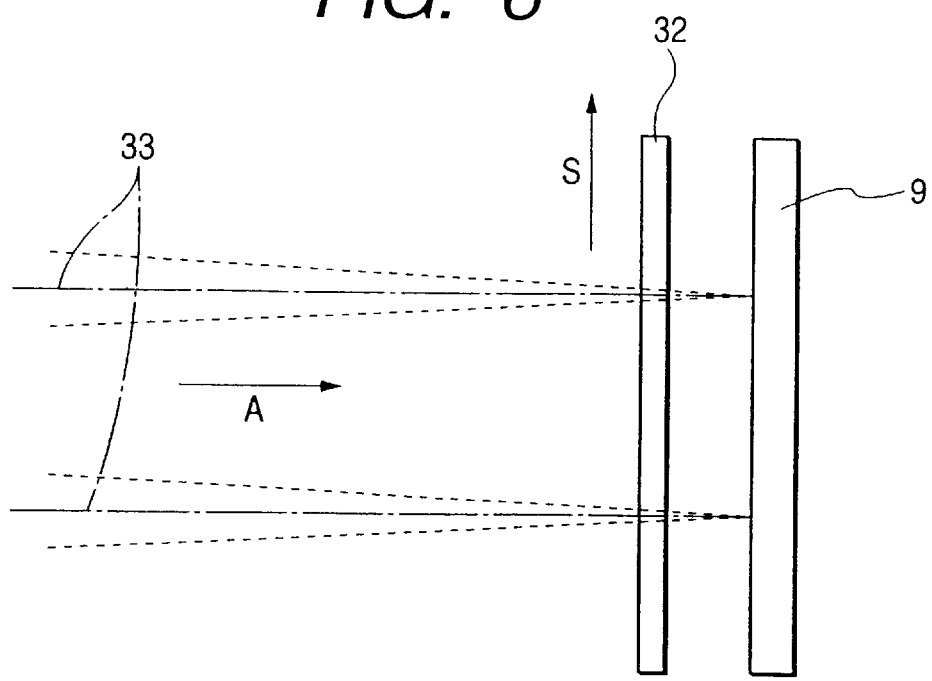
FIG. 6 is an enlarged explanatory diagram to show the region around a linear photosensor illustrated in FIG. 2.
Figure 7:
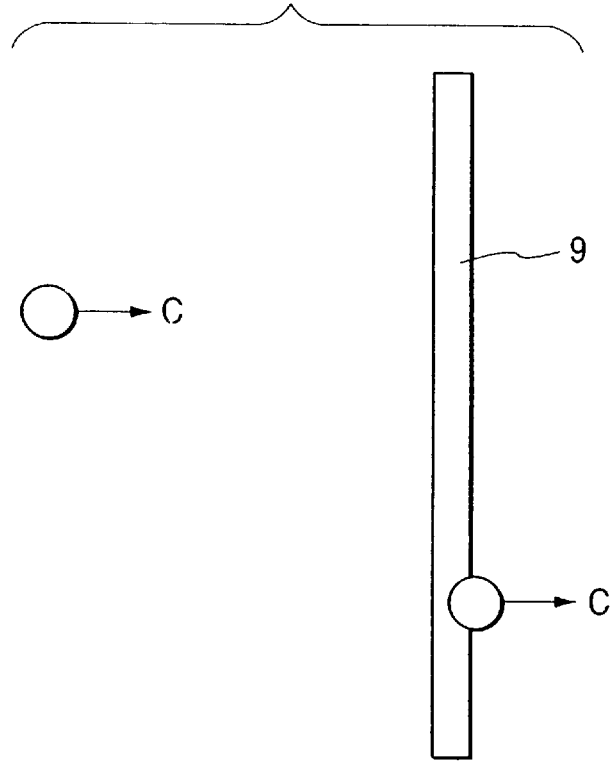
FIG. 7 is an explanatory diagram to show a state of light beams incident to the linear photosensor of Embodiment 1 of the present invention.

FIG. 6 and FIG. 7 are enlarged explanatory diagrams of the linear photosensor illustrated in FIG. 2 and FIG. 3, wherein FIG. 6 is a sectional view of the vicinity of the linear photosensor and FIG. 7 an explanatory diagram as a view from the direction A of FIG. 6.

In the figures, numeral 32 designates a light quantity corrector plate, which is disposed in front of the linear photosensor 9, and which limits the quantity of the beams incident to the linear photosensor 9. Further, 33 33 represent the optical axes of the plural light beams.

Generally speaking, in the optical scanning apparatus the drawing positions in the sub-scanning direction move in the direction of arrow S illustrated in FIG. 6 because of thermal expansion etc. of the members in the apparatus with variations in temperature of the apparatus, and the focal positions thereof also vary. This variation results in deviation of image, which is the cause of degrading the drawn image.

In the present embodiment, the deviation of scanning positions and the variation of magnification of the optical system occurring with temperature changes in the present apparatus are detected by detecting the scanning positions in the sub-scanning direction of the light beams having the predetermined intervals in the main scanning direction and in the sub-scanning direction and entering the linear photosensor 9 at the predetermined speed, and the difference between pass times of the light beams, using output signals from the linear photosensor 9.

Figure 8:
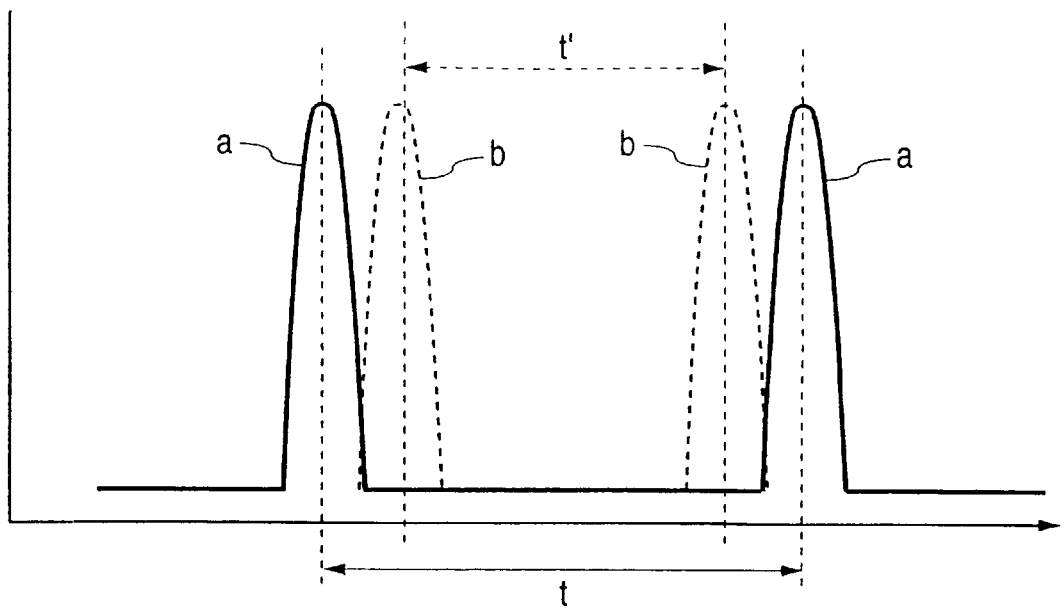
FIG. 8 is an explanatory diagram to show output signals from the linear photosensor of Embodiment 1 of the present invention.

For example, let us suppose here that the temperature in the apparatus increases. The distance from the light-emitting points to the image surface increases because of the thermal expansion etc. of the members constituting the apparatus, whereby output signals from the linear photosensor 9 vary from solid lines a to dotted lines b as illustrated in FIG. 8.

Namely, the pass time from a light beam first incident to the linear photosensor 9 to a light beam next incident thereto becomes shorter as t (before the increase of temperature) declines to t' (after the increase of temperature) In the present embodiment this variation of the pass time is detected to detect a change of optical pathlength (degree of unsharpness), and the scanning positions of the light beams in the sub-scanning direction are detected to detect the variation of magnification of the optical system and the deviation of scanning positions. FIG. 8 is an explanatory diagram to show a state of output signals from the linear photosensor 9, in which the abscissa indicates the time and the ordinate the output signal level.

A method for correcting the image deviation will be described next referring to FIG. 9.

Figure 9:
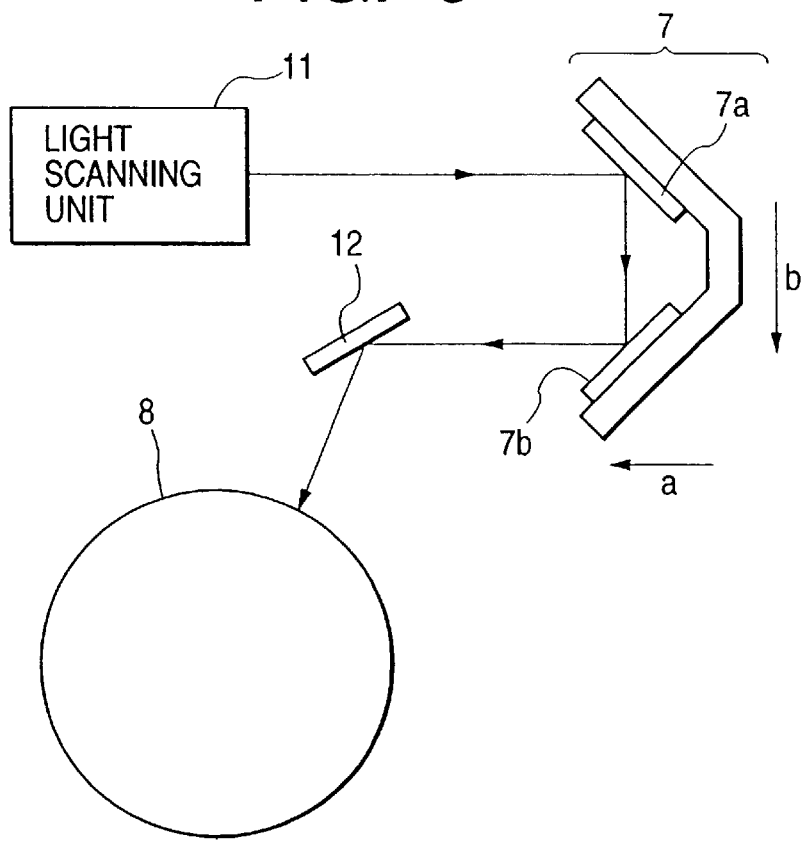
FIG. 9 is a view in a sub-scanning section to show means for correcting image deviation in Embodiment 1 of the preset invention.

FIG. 9 is a sectional view of a major part in the sub-scanning direction of the present embodiment (a view in the sub-scanning section), which shows an example of the method for correcting the image deviation.

In the same figure, reference numeral 11 designates the light scanning unit, which has the multi-laser light source, collimator lens, cylindrical lens, optical deflector, imaging lens, etc. illustrated in above FIG. 2 and which emits a plurality of light beams. Numeral 7 represents the angled mirror as the correcting means (a right angle type reflector), which is arranged so as to be movable in the directions of arrows a and b in the figure (i.e., along the directions of the optical axis) and, for example, which is moved in the directions of arrows a and b in the figure, based on the result of detection by the linear photosensor (not illustrated), to correct the drawing positions of the light beams on the photosensitive drum surface 8. Numeral 12 denotes a fixed return mirror and 8 the photosensitive drum surface as a scanned surface.

In the present embodiment, for example, supposing the optical pathlength lengthens because of increase of temperature in the apparatus (the optical system), the angled mirror 7 will be moved in the direction of arrow a in the figure to cancel an amount of elongation of the optical pathlength. In conjunction therewith the angled mirror 7 is also moved in the direction of arrow b in the figure in order to compensate for the change of irradiation positions on the photosensitive drum surface 8. This permits correction for the image deviation occurring with temperature change.

Next described is a method for determining the timing of correction for the drawing positions in the present embodiment.

In the present embodiment, the correcting means (for example, the angled, mirror or the like) corrects the drawing positions of the light beams on the photosensitive drum surface when either the amounts of the scanning position deviation or the magnification variation detected by the detecting means (linear photosensor) reaches a predetermined level (allowed value).

Figure 10:
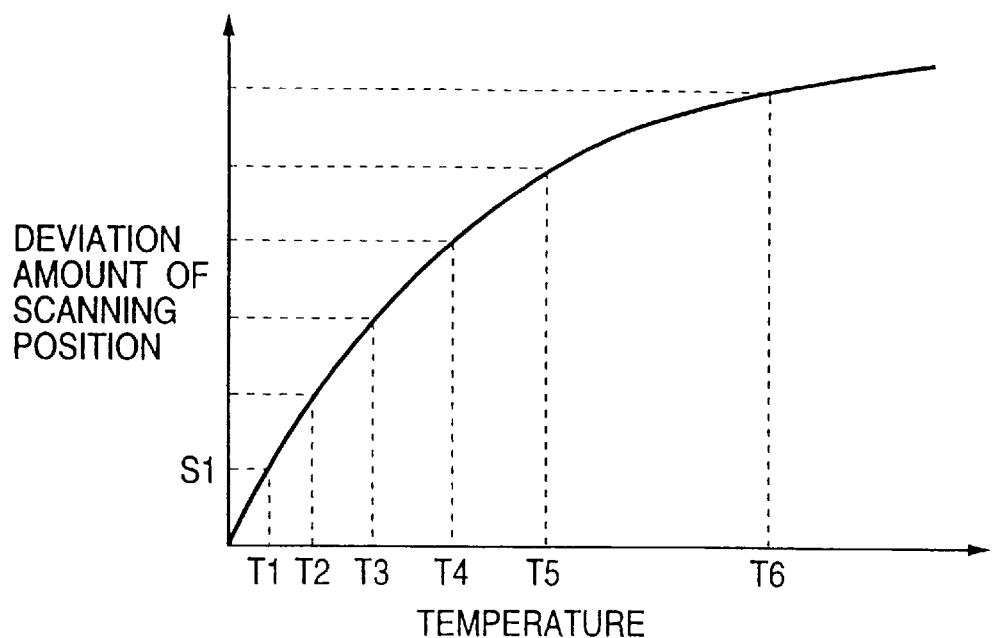
FIG. 10 is an explanatory diagram to show the relationship between temperature and the deviation amount of scanning positions of the optical scanning apparatus of Embodiment 1 of the present invention.
Figure 11:
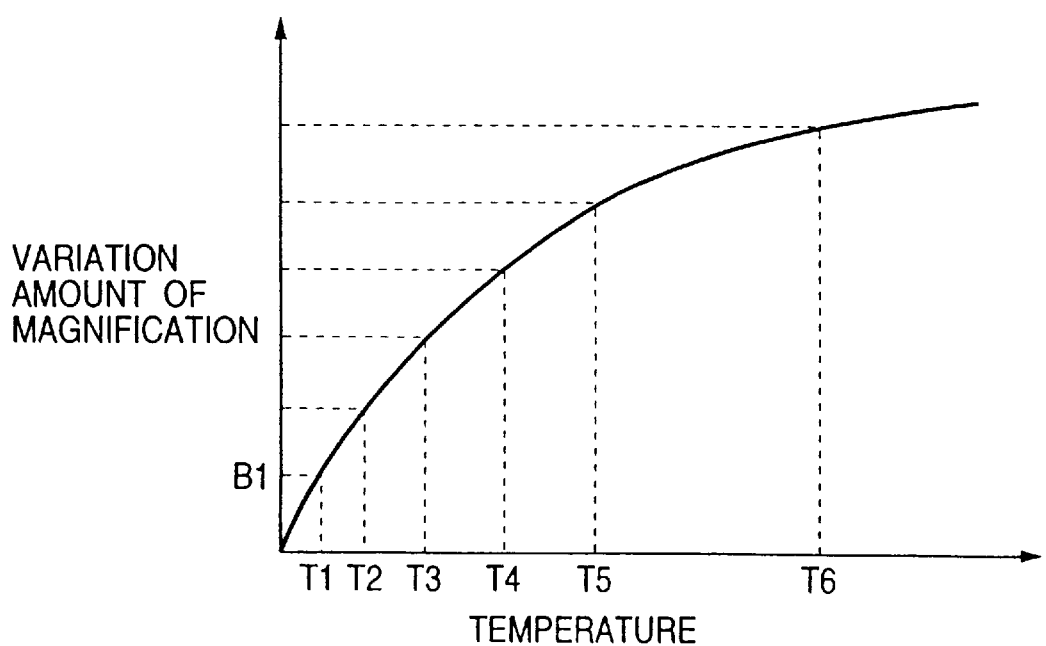
FIG. 11 is an explanatory diagram to show the relationship between temperature and the variation amount of magnification of the optical scanning apparatus of Embodiment 1 of the present invention.

Specifically, when either the amount of the scanning position deviation or the magnification variation detected by the detecting means reaches the predetermined level (allowed value S1 or allowed value B1) as illustrated in FIG. 10 and FIG. 11, the correcting means corrects the drawing positions of the light beams on the photosensitive drum surface. Since the scanning position deviation results in drawing position deviation that degrades the image, there exists an allowed value, S1, determined from the image, as illustrated in FIG. 10. Likewise, the variation of magnification also occurs with temperature change as illustrated in FIG. 11, and the allowed value, B1, of this variation of magnification is also determined from the image.

In the present embodiment, the detection of the deviation of scanning positions and the variation of magnification by the detecting means is carried out after the power of the optical scanning apparatus is turned on.

FIG. 10 is an explanatory diagram to show the relationship between temperature and deviation amount of scanning positions, of the optical scanning apparatus, in which the abscissa represents the temperature of the optical scanning apparatus, the ordinate the deviation amount of scanning positions, and S1 the allowed value of the deviation amount of scanning positions. FIG. 11 is an explanatory diagram to show the relationship between temperature and variation amount of magnification of the optical scanning apparatus, in which the abscissa represents thy temperature of the optical scanning apparatus, the ordinate the variation amount of magnification, and B1 the allowed value of the variation amount of magnification.

Next described is another method for determining the timing of correction for the drawing positions in the present embodiment.

The apparatus in this case has the detecting means located substantially at the same position as the photosensitive drum surface and in the normal direction to the main scanning direction, and is arranged to detect the deviation of scanning positions and the variation of magnification by detecting the scanning positions of the light beams and differences between pass times of the light beams, while the light beams from the light source means via the optical deflector are focused thereon by the imaging means. The correcting means for correcting the drawing positions of the optical beams on the photosensitive drum surface, and the temperature detecting means are disposed in the optical scanning apparatus, and the apparatus is constructed so that the temperature detecting means detects the temperature in the optical scanning apparatus after power-on of the optical scanning apparatus, and the correcting means corrects the drawing positions of the light beams, based on the detection result of the detecting means in accordance with a change of the detected temperature (for example, an increase) or whenever the detected temperature reaches a preset temperature.

The temperature detected by the temperature detecting means can be one anywhere in the optical scanning apparatus, but it is desirably the temperature of the part causing thermal deformation which gives rise to the deviation of scanning positions.

In the present embodiment, where the deviation of scanning positions and the variation of magnification are detected at regular intervals, a good image can always be obtained if the correcting means corrects the drawing positions of the light beams on the photosensitive drum surface when either one of them reaches the allowed value S1 or B1.

In practice, there are possibly cases where it is not easy to always monitor the deviation of scanning positions and the variation of magnification in terms of the timing on the routine of image formation and the cost. In such cases a good image can also always be obtained as above by such arrangement that the detecting means detects the deviation of scanning positions and the variation of magnification every time the temperature arrives at one of the preset temperatures T1, T2, T3, T4, T5, . . . as illustrated in FIG. 10 and FIG. 11, and that the correcting means corrects the drawing positions of the light beams on the photosensitive drum surface, based on the detection result, as described above.

Next described is another method for determining the timing of correction for the drawing positions in the present embodiment.

The apparatus in this case has the detecting means located substantially at the same position as the photosensitive drum surface and in the normal direction to the main scanning direction, and arranged to detect the deviation of scanning positions and the variation of magnification by detecting the scanning positions of the light beams and the differences between pass times of the light beams, while the light beams from the light source means via the optical deflector are focused thereon by the imaging means. The correcting means for correcting the drawing positions of the light beams on the photosensitive drum surface, and the time measuring means for measuring the time after power-on of the optical scanning apparatus, and the apparatus are arranged so that the correcting means corrects the drawing positions of the light beams, based on the detection result of the detecting means, in accordance with the measured time or at a preset time.

Figure 12:
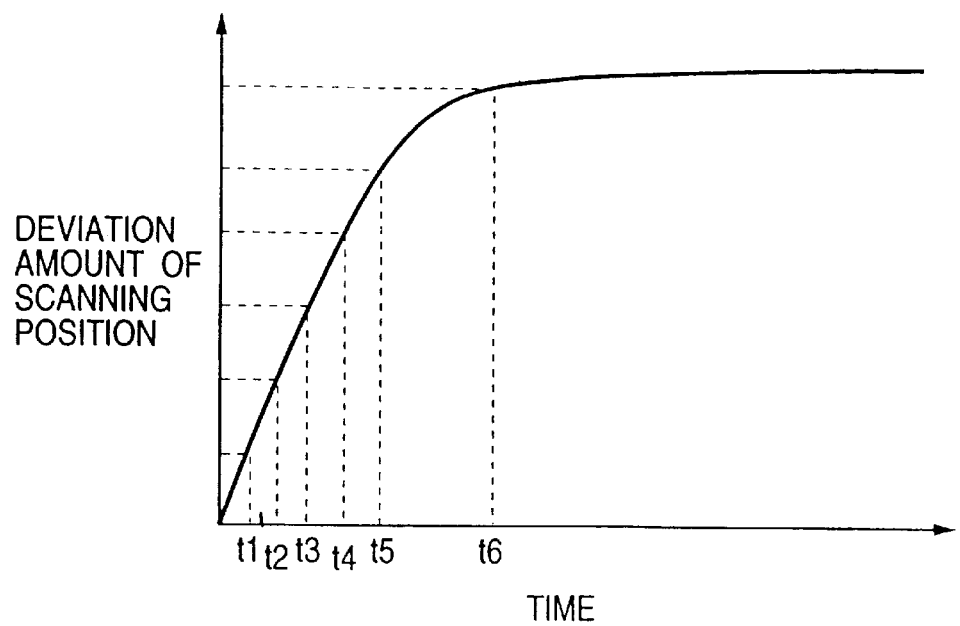
FIG. 12 is an explanatory diagram to show the relationship between time and the deviation amount of scanning positions after power-on in Embodiment 1 of the present invention.

FIG. 12 is an explanatory diagram to show the relationship between time after power-on and deviation amount of scanning positions, in which the abscissa represents the time after power-on of the optical scanning apparatus and the ordinate the deviation amount of scanning positions.

As illustrated in the same figure, as the temperature in the apparatus increases with a lapse of time because of the heat of a fixing unit, a scanner motor, etc. in the optical scanning apparatus (or around it) after power-on, the deviation of scanning positions and the variation of magnification vary because of the thermal deformation, mode hopping of laser, variations in the refractive index of the optical system, and so on. In this method the detecting means detects the deviation of scanning positions (and the variation of magnification), as described above, at each of preset times t1, t2, t3, t4, t5, . . . as illustrated in the same figure, and the correcting means corrects the drawing positions of the light beams on the photosensitive drum surface, based on the detection result as described above, thereby obtaining a good image.

The drawing positions of the image can be corrected by the method of changing the position of the angled mirror as the correcting means according to the scanning position deviation and the magnification variation as described above, or by a method of electrically shifting the drawing timing.

The methods for determining the timing of correction for the drawing positions described above can also be applied to image forming apparatus for forming an image by transferring it onto a recording medium by use of the optical scanning apparatus of the present embodiment.

Next described is another method for determining the timing of correction for the drawing positions where the optical scanning apparatus of the present embodiment is applied to the image forming apparatus.

The apparatus herein has the detecting means located substantially at the same position as the photosensitive drum surface and in the normal direction to the main scanning direction, and arranged to detect the deviation of scanning positions and the variation of magnification by detecting the scanning positions of the light beams and the differences between pass times of the light beams while the light beams from the light source means via the optical deflector are focused thereon by the imaging means. The correcting means for correcting the drawing positions of the light beams on the photosensitive drum surface, and a number-of-printed-sheets calculating means for calculating the number of printed sheets after power-on of the image forming apparatus, and the apparatus are arranged so that, based on a signal from the number-of-printed-sheets calculating means, the correcting means corrects the drawing positions of the light beams, based on the detection result of the detecting means.

Figure 13:
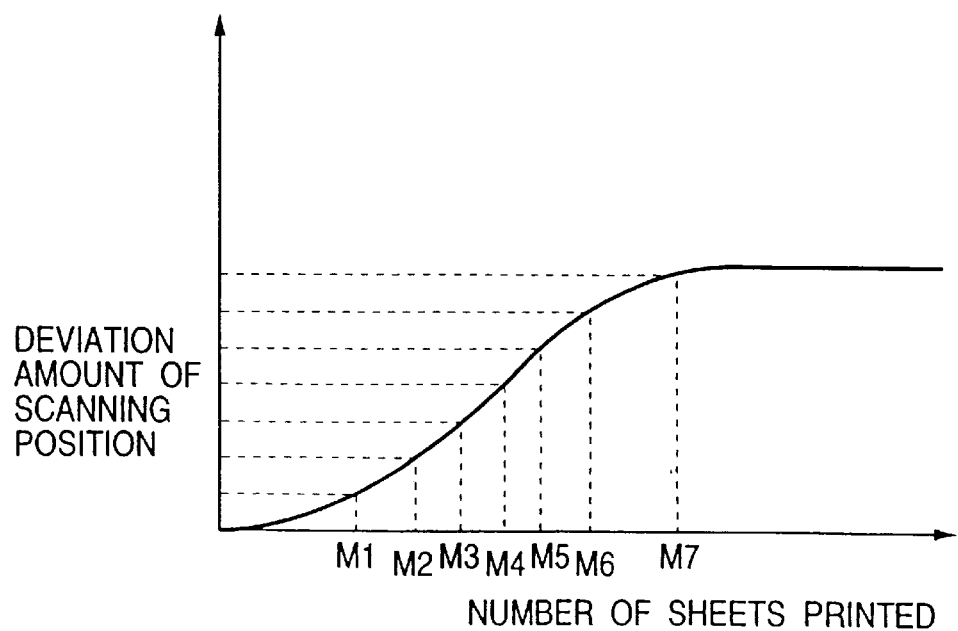
FIG. 13 is an explanatory diagram to show the relationship between the number of sheets printed during continuous output and the deviation amount of scanning positions in Embodiment 1 of the present invention.

FIG. 13 is an explanatory diagram to show the relationship between number of printed sheets during continuous output and deviation amount of scanning positions, in which the abscissa represents the number of printed sheets during continuous output and the ordinate the deviation amount of scanning positions.

As illustrated in the same figure, during the continuous output, the temperature in the image forming apparatus increases because of the heat of the fixing unit and various motors, so that the amount of deviation of scanning positions increases with increasing number of output sheets. When the number reaches each of preset numbers M1, M2, M3, M4, M5, ... as illustrated in the same figure, the detecting means detects the deviation of scanning positions (and the variation of magnification), and the correcting means corrects the drawing positions of the light beams on the photosensitive drum surface, based on the detection result as described above, whereby a good image can be formed.

In the present embodiment, each of the determining methods of the timing of correction for the drawing positions described above was used separately, but, without having to be limited to this, they may be used, for example, in combination. This permits correction with higher accuracy.

In the present embodiment, as described above, the linear photosensor 9 as the detecting means is located substantially at the same position as the photosensitive drum surface 8. The light beams from the multi-laser light source 1 via the optical deflector 5 are focused on the surface of the linear photosensor 9 by the imaging lens system 6. The linear photosensor 9 detects the scanning positions of the light beams in the sub-scanning direction and the difference between pass times of the light beams, thereby detecting the deviation of scanning positions and the variation of magnification of the optical system occurring with temperature change of the apparatus, and, based on the detection result, the correcting means, for example, the angled mirror 7 or the like, corrects the drawing positions of the light beams on the photosensitive drum surface 8. By this, a good image is obtained without image deviation.

Figure 14:
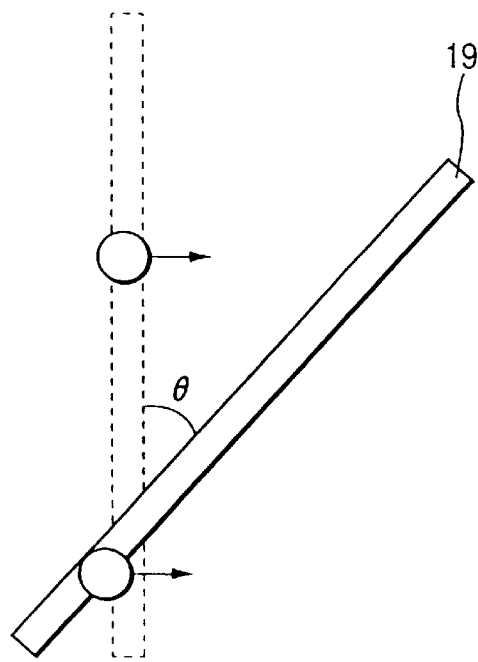
FIG. 14 is an explanatory diagram to show a state of light beams incident to the linear photosensor of Embodiment 2 of the present invention.

FIG. 14 is an enlarged explanatory diagram of the linear photosensor associated with Embodiment 2 of the present invention.

The present embodiment is different from Embodiment 1 described above in that a plurality of light-emitting portions constituting the multi-laser light source are arranged in the normal direction (in the sub-scanning direction) to the main scanning direction and, in connection therewith, the linear photosensor is arranged as inclined by an angle θ to the main scanning direction. The other structure and optical action are substantially the same as in aforementioned Embodiment 1, thereby accomplishing the like effect.

In the same figure, reference numeral 19 denotes the linear photosensor as the detecting means which is arranged as inclined by the angle θ with respect to the main scanning direction.

Figure 15:
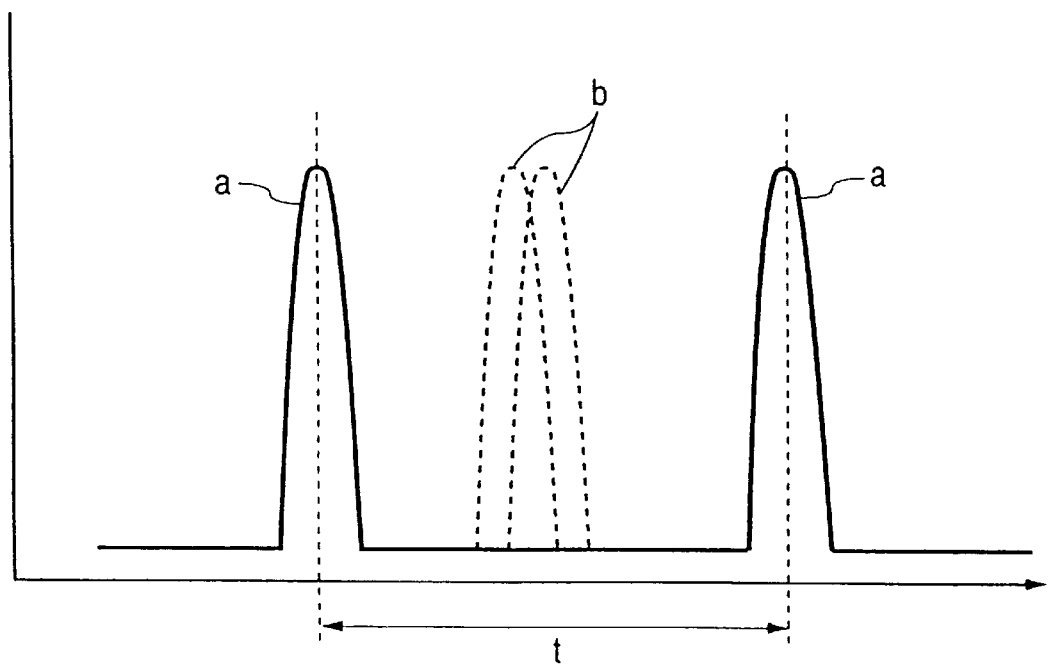
FIG. 15 is an explanatory diagram to show output signals from the linear photosensor of Embodiment 2 of the present invention.

In the present embodiment, as illustrated in the same figure, if the plurality of light beams scan the scanned surface in a substantially linearly aligned state in the sub-scanning direction, there will be little difference between pass times of the light beams when measured by the linear photosensor, indicated by dotted lines, which is linearly arranged in the sub-scanning direction as in Embodiment 1. In this case, the signals indicated by dotted lines b of FIG. 15 are outputted from the linear photosensor and it is not easy to detect the variation of magnification of the optical system from the difference between pass times. FIG. 15 is an explanatory diagram to show output signals from the linear photosensor, in which the abscissa represents the time and the ordinate the output signal level.

In the present embodiment, the linear photosensor 19 is thus arranged as inclined by the angle θ with respect to the main scanning direction as indicated by the solid lines of FIG. 14, whereby the linear photosensor 19 outputs the signals indicated by solid lines a of FIG. 15, so as to increase the pass time t. Based on this arrangement, the present embodiment can detect the deviation of scanning positions and the variation of magnification of the optical system occurring with temperature changes in the apparatus with high accuracy, by detecting the scanning positions of the light beams in the sub-scanning direction and the difference between pass times of the light beams as above Embodiment 1 did.

Figure 16:
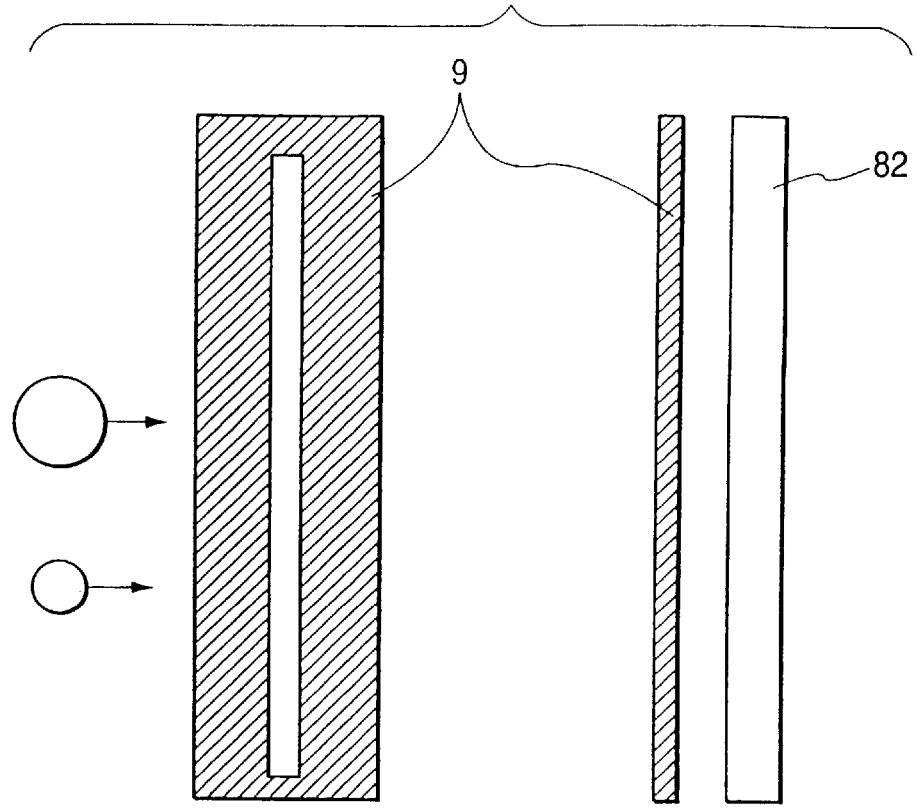
FIG. 16 is an enlarged explanatory diagram to show the region around the linear photosensor in Embodiment 3 of the present invention.

FIG. 16 is an enlarged explanatory drawing of the linear photosensor associated with Embodiment 3 of the present invention.

The present embodiment is different from above Embodiment 1 in that a slit is disposed in front of the linear photosensor and the variation of magnification of the optical system and the deviation of scanning positions are detected by detecting variation of intensity of the output signals from the linear photosensor through the slit and the scanning positions of the light beams in the sub-scanning direction. The other structure and optical action are substantially the same as in above Embodiment 1, thereby achieving the like effect.

In the same figure, reference numeral 82 denotes a vertically long slit, which is disposed in front of the linear photosensor 9 and in parallel to the linear photosensor 9.

In the present embodiment, the variation of magnification of the optical system occurring with temperature changes in the apparatus is detected by detecting light intensity (unsharpness) of a spot incident through this vertically long slit 82 to the linear photosensor 9.

Figure 17:
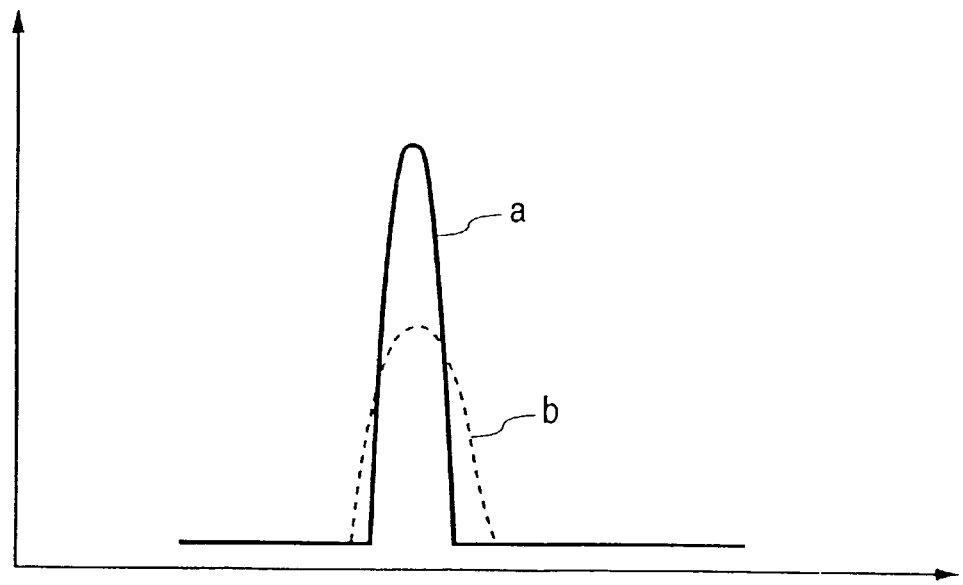
FIG. 17 is an explanatory diagram to show output signals from the linear photosensor of Embodiment 3 of the present invention.

In the present embodiment, as the temperature of the apparatus increases, the size (peak value) of a desired beam spot (spot shape) varies considerably from solid line a to dotted line b as illustrated in FIG. 17, because of elongation of optical pathlength. In other words, the output level (peak value) from the linear photosensor 9 decreases with unsharpness of spot.

In the present embodiment, the variation of output level at this time is detected and, based on the detection result, the elongation of the optical pathlength (the variation of magnification) is corrected by the correcting means; for example, by the aforementioned angled mirror, so as to maintain the best focus, thereby obtaining the beam spots without unsharpness.

The image forming apparatus of Embodiment 4 of the present invention will be described below.

The present embodiment employs a plurality of optical scanning devices described above, and is arranged to form a color image by multiply transferring images obtained by the optical scanning devices each onto a recording medium. In the present embodiment, each optical scanning device is arranged, as in each of the embodiments described above, in such structure that the detecting means detects the deviation of scanning positions and the variation of magnification of the optical system occurring with temperature changes in the apparatus, and that the correcting means corrects the drawing positions of light beams on the scanned surface, based on the detection result. In this structure, the apparatus obtains a good color image without image deviation (chromatic deviation).

It is noted that the present invention can also be applied to detection of the scanning position deviation and the variation of magnification of the optical system occurring due to causes other than temperature changes.

The present invention can provide the optical scanning apparatus having the multi-laser light source as described above, capable of obtaining the good image, and the image forming apparatus incorporating it, by arranging them so that the deviation of scanning positions and the variation of magnification are detected by the simple detecting means comprised of the single sensor, and that the correcting means corrects the image deviation, based on the detection result.

In addition, the present invention can also provide the optical scanning apparatus having the multi-laser light source as described above and being capable of obtaining the good image, and the image forming apparatus incorporating it, by arranging them so that the deviation of scanning positions and the variation of magnification occurring with temperature changes in the apparatus are detected by the simple detecting means comprised of the single sensor and that the correcting means corrects the image deviation, based on the detection result.

What is claimed is:

1. An optical scanning apparatus comprising:
   a light source having a plurality of light-emitting portions arranged as inclined with respect to a main scanning direction;
   a deflector for deflecting a plurality of light beams emitted from said light source;
   an imaging system for guiding the plurality of light beams deflected and reflected by said deflector, onto a scanned surface;
   a photosensor arranged substantially at the same position as said scanned surface and in a normal direction to said main scanning direction, said photosensor detecting scanning positions of the plurality of light beams and a difference between pass times of the plurality of light beams, thereby detecting deviation of the scanning positions and variation of magnification occurring with change of temperature of said optical scanning apparatus; and
   a correction system for correcting drawing positions of the plurality of light beams on said scanned surface, based on the result of detection by said photosensor.

2. The optical scanning apparatus according to claim 1, wherein when at least one of an amount of the deviation of the scanning positions and an amount of the variation of magnification detected by said photosensor reaches a predetermined level, said correction system corrects the drawing positions of the plurality of light beams on said scanned surface.

3. The optical scanning apparatus according to claim 1, wherein, based on the result of detection by said photosensor at a predetermined time after power-on of said optical scanning apparatus, said correction system corrects the drawing positions of the plurality of light beams on said scanned surface.

4. The optical scanning apparatus according to any one of claims 1, 2 or 3, said optical scanning apparatus being used in an image forming apparatus for forming a color image by multiply transferring images obtained by use of a plurality of optical scanning devices each onto a recording medium.

5. An optical scanning apparatus comprising:
   a light source having a plurality of light-emitting portions arranged as inclined with respect to a main scanning direction;
   a deflector for deflecting a plurality of light beams emitted from said light source;
   an imaging system for guiding the plurality of light beams deflected and reflected by said deflector, onto a scanned surface;
   a photosensor arranged substantially at the same position as said scanned surface and in a normal direction to said main scanning direction, said photosensor detecting scanning positions of the plurality of light beams and a difference between pass times of the plurality of light beams, thereby detecting deviation of the scanning positions and variation of magnification;
   a correction system for correcting drawing positions of the plurality of light beams on said scanned surface; and
   a temperature detector provided in said optical scanning apparatus,
   wherein said temperature detector detects a temperature in said optical scanning apparatus after power-on of said optical scanning apparatus and said correction system corrects the drawing positions of the plurality of light beams, based on the result of detection by said photosensor, in accordance with change of the temperature detected, or every time the temperature detected reaches a preset temperature.

6. An optical scanning apparatus comprising:
   a light source having a plurality of light-emitting portions arranged as inclined with respect to a main scanning direction;
   a deflector for deflecting a plurality of light beams emitted from said light source;
   an imaging system for guiding the plurality of light beams deflected and reflected by said deflector, onto a scanned surface;
   a photosensor arranged substantially at the same position as said scanned surface and in a normal direction to said main scanning direction, said photosensor detecting scanning positions of the plurality of light beams and a difference between pass times of the plurality of light beams, thereby detecting deviation of the scanning positions and variation of magnification;
   a correction system for correcting drawing positions of the plurality of light beams on said scanned surface; and
   a time counter for measuring a time after power-on of said optical scanning apparatus,
   wherein said correction system corrects the drawing positions of the plurality of light beams, based on the result of detection by said photosensor, in accordance with the time measured by said time counter, or at a preset time.

7. The optical scanning apparatus according to either claim 5 or 6, said optical scanning apparatus being used in an image forming apparatus for forming an image by transferring an image obtained by use of the optical scanning apparatus onto a recording medium.

8. The optical scanning apparatus according to either claim 5 or 6, said optical scanning apparatus being used in an image forming apparatus for forming a color image by transferring images obtained by use of a plurality of optical scanning devices each onto a recording medium.

9. An image forming apparatus comprising:
a light source having a plurality of light-emitting portions arranged as inclined with respect to a main scanning direction;
a deflector for deflecting a plurality of light beams emitted from said light source;
an imaging system for guiding the plurality of light beams deflected and reflected by said deflector, onto an image carrier surface;
a photosensor arranged substantially at the same position as said image carrier surface and in a normal direction to said main scanning direction, said photosensor detecting scanning positions of the plurality of light beams and a difference between pass times of the plurality of light beams, thereby detecting deviation of the scanning positions and variation of magnification;
a correction system for correcting drawing positions of the plurality of light beams on said image carrier surface; and
a printed-sheet counter for calculating a number of printed sheets after power-on of said image forming apparatus,
wherein, based on a signal from said printed-sheet counter, said correction system corrects the drawing positions of the plurality of light beams, based on the result of detection by said photosensor.

10. An optical scanning apparatus comprising:
a light source having a plurality of light-emitting portions arranged as inclined with respect to a main scanning direction;
a deflector for deflecting a plurality of light beams emitted from said light source;
an imaging system for guiding the plurality of light beams deflected and reflected by said deflector, onto a scanned surface;
a photosensor arranged substantially at the same position as said scanned surface and in a normal direction to said main scanning direction, said photosensor detecting scanning positions of the plurality of light beams and a difference between pass times of the plurality of light beams, thereby detecting deviation of the scanning positions and variation of magnification of said optical scanning apparatus; and
a correction system for correcting drawing positions of the plurality of light beams on said scanned surface, based on the result of detection by said photosensor.

11. The optical scanning apparatus according to claim 10, wherein when at least one of an amount of the deviation of the scanning positions and an amount of the variation of magnification detected by said photosensor reaches a predetermined level, said correction system corrects the drawing positions of the plurality of light beams on said scanned surface.

12. The optical scanning apparatus according to claim 10, wherein, based on the result of detection by said photosensor at a predetermined time after power-on of said optical scanning apparatus, said correction system corrects the drawing positions of the plurality of light beams on said scanned surface.

13. The optical scanning apparatus according to claim 10, said optical scanning apparatus being used in an image forming apparatus for forming a color image by multiply transferring images obtained by use of a plurality of optical scanning devices each onto a recording medium.

14. An optical scanning apparatus comprising:
a light source having a plurality of light-emitting portions;
a deflector for deflecting a plurality of light beams emitted from said light source;
an imaging system for guiding the plurality of light beams deflected by said deflector, onto a scanned surface;
a photosensor for detecting deviation of scanning positions and variation of magnification of the plurality of light beams ocurring with environmental changes of said optical scanning apparatus; and
a correction system for correction drawing positions of the plurality of light beams on said scanned surface, based on the result of detection by said photosensor.

15. The optical scanning apparatus according to claim 14, wherein said photosensor detects deviation of scanning positions and variation of magnifications of the plurality of light beams occurring with change of temperature of said optical scanning apparatus.

16. The optical scanning apparatus according to claim 14, wherein said photosensor detects deviation of scanning positions and variation of magnifications of the plurality of light beams occurring with environmental changes of said optical scanning apparatus, by detecting scanning positions of the plurality of light beams and a difference between pass times of said plurality of light beams.

17. The optical scanning apparatus according to claim 16, wherein the plurality of light-emitting portions are arranged as inclined with respect to a main scanning direction and said photosensor is arranged in a normal direction to said main scanning direction.

18. The optical scanning apparatus according to claim 16, wherein the plurality of light-emitting portions are arranged in a normal direction to a main scanning direction and said photosensor is arranged an inclined with respect to said main scanning direction.

19. The optical scanning apparatus according to claim 14, wherein said photosensor detects deviation of scanning positions and variation of magnifications of the plurality of light beams occurring with environmental changes of said optical scanning apparatus, by detecting scanning positions and intensity variation of output signals of the plurality of light beams.

20. The optical scanning apparatus according to claim 19, further comprising a slit disposed in front of said photosensor.

21. The optical scanning apparatus according to claim 20, wherein the plurality of light-emitting portions are arranged as inclined with respect to a main scanning direction and said photosensor is arranged in a normal direction to said main scanning direction.

22. The optical scanning apparatus according to claim 20, wherein the plurality of light-emitting portions are arranged in a normal direction to a main scanning direction and said photosensor is arranged as inclined with respect to said main scanning direction.

23. The optical scanning apparatus according to claim 14, wherein said photosensor is arranged substantially at the same postion as said scanned surface.

24. The optical scanning apparatus according to claim 15, further comprising a temperature detector provided in said optical scanning apparatus, wherein said temperature detector detects a temperature in said optical scanning apparatus after power-on of said optical scanning apparatus and said correction system corrects the drawing positions of the plurality of light beams, based on the result of detection by said photosensor, in accordance with change of the temperature detected, or every time the temperature detected reaches a preset temperature.

25. The optical scanning apparatus according to claim 14, further comprising a time counter for measuring a time after power-on of said optical scanning apparatus, wherein said correction system corrects the drawing positions of the plurality of light beams, based on the result of detection by said photosensor, in accordance with the time measured by said time counter, or at a preset time.

26. The optical scanning apparatus according to claim 14, further comprising a printed-sheets counter for calculating a number of printed sheets after power-on of said optical scanning apparatus, wherein, based on a signal from said printed-sheets counter, said correction system corrects the drawing positions of the plurality of light beams, based on the result of detection by said photosensor.

27. The optical scanning apparatus according to claim 14, wherein when at least one of an amount of the deviation of the scanning positions and an amount of the variation of magnifications detected by said photosensor reaches a predetermined level, said correction system corrects the drawing positions of the plurality of light beams on said scanned surface.

28. An image forming apparatus comprising an optical scanning apparatus according to any of claims 14 through 27, and a controller for generating a correction signal to be sent to said correction system, based on the result of detection by said photosensor, wherein said scanned surface is an image carrier.

29. An image forming apparatus for forming a color image, comprising a plurality of optical scanning apparatus according to any of claims 14 through 27, wherein images obtained by using said plurality of optical scanning apparatus are multi-transferred onto a recording medium.

* * * * *

UNITED STATES PATENT AND TRADEMARK OFFICE
CERTIFICATE OF CORRECTION

PATENT NO. : 6,459,520 B1  
DATED : October 1, 2002  
INVENTOR(S) : Hidemi Takayama It is certified that error appears in the above-identified patent and that said Letters Patent is hereby corrected as shown below:

Title page,
Item [57], ABSTRACT,
Line 7, "a" should read -- and a --.

Column 11,
Line 17, "Sa" should read -- 5a --.

Column 13,
Line 13, "thy" should read -- the --.

Column 20,
Line 9, "ocurring" should read -- occurring --;
Line 11, "correction" (second occurrence) should read -- correcting --; and
Line 35, "an" should read -- as --.

Signed and Sealed this

Twenty-fifth Day of March, 2003

JAMES E. ROGAN
*Director of the United States Patent and Trademark Office*